US012801941B2

(12) United States Patent
Theagarajan et al.

(10) Patent No.: US 12,801,941 B2
(45) Date of Patent: Nov. 17, 2026

(54) KNOWLEDGE DISTILLATION FOR SEMICONDUCTOR-BASED APPLICATIONS

(71) Applicant: KLA Corporation, Milpitas, CA (US)

(72) Inventors: Rajkumar Theagarajan, Milpitas, CA (US); Jing Zhang, Santa Clara, CA (US); Yujie Dong, Newark, CA (US); Kris Bhaskar, San Jose, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 17/677,887

(22) Filed: Feb. 22, 2022

(65) Prior Publication Data

US 2023/0136110 A1 May 4, 2023

Related U.S. Application Data

(60) Provisional application No. 63/274,028, filed on Nov. 1, 2021.

(51) Int. Cl.
*G06N 5/022* (2023.01)
*G06N 20/20* (2019.01)
*G06V 10/774* (2022.01)

(52) U.S. Cl.
CPC ............ *G06N 5/022* (2013.01); *G06N 20/20* (2019.01); *G06V 10/774* (2022.01)

(58) Field of Classification Search
CPC ....... G06N 5/022; G06N 20/20; G06V 10/774
See application file for complete search history.

(56) References Cited

U.S. PATENT DOCUMENTS 8,126,255 B2 2/2012 Bhaskar et al.
8,664,594 B1 3/2014 Jiang et al.
(Continued)

FOREIGN PATENT DOCUMENTS

CN 110310260 10/2019
CN 113343796 9/2021

OTHER PUBLICATIONS

Lee et al., Trace Data Analytics with Knowledge Distillation DM: Big Data Management and Mining, Aug. 2020. (Year: 2020).*
(Continued)

*Primary Examiner* — Marshall L Werner
(74) *Attorney, Agent, or Firm* — Entropy Matters LLC

(57) ABSTRACT

Methods and systems for determining information for a specimen are provided. One system includes a computer subsystem and one or more components executed by the computer subsystem that include multiple deep learning (DL) models configured for determining information for a specimen based on output generated by the specimen with learning mode(s) of an imaging subsystem. The one or more components also include a knowledge distillation component configured for combining output generated by the multiple DL models. In addition, the one or more components include a final knowledge distilled DL model configured for determining information for the specimen or an additional specimen based on output generated for the specimen or the additional specimen with runtime mode(s) of the imaging subsystem. Before the final KD DL model determines the information, the knowledge distillation component is configured for supervised training of the final knowledge distilled DL model using the combined output.

30 Claims, 3 Drawing Sheets

(56) References Cited

U.S. PATENT DOCUMENTS

| | | | |
|---|---|---|---|
| 8,692,204 B2 | 4/2014 | Kojima et al. | |
| 8,698,093 B1 | 4/2014 | Gubbens et al. | |
| 8,716,662 B1 | 5/2014 | MacDonald et al. | |
| 9,222,895 B2 | 12/2015 | Duffy et al. | |
| 9,816,939 B2 | 11/2017 | Duffy et al. | |
| 2020/0327654 A1* | 10/2020 | Zhang | G06T 7/0004 |
| 2020/0364565 A1 | 11/2020 | Kostem | |
| 2021/0034985 A1* | 2/2021 | Vongkulbhisal | G06N 3/098 |
| 2021/0097400 A1* | 4/2021 | Lee | G06N 3/045 |

OTHER PUBLICATIONS

Radosavovic et al., Data Distillation: Towards Omni-Supervised Learning, Dec. 2017. (Year: 2017).*

International Search Report and Written Opinion for PCT/US2022/047629 mailed Feb. 20, 2023.

Lee et al., "Trace Data Analytics with Knowledge Distillation: DM: Big Data Management and Mining," 2020 31st Annual SEMI Advanced Semiconductor Manufacturing Conference (ASMC), IEEE, Aug. 24, 2020, pp. 1-8.

Choi et al., "Data-Free Network Quantization With Adversarial Knowledge Distillation," 2020 IEEE/CVF Conference on Computer Vision and Pattern Recognition Workshops (CVPRW), IEEE, Jun. 14, 2020, pp. 3047-3057.

Furlanello et al., "Born-Again Neural Networks," arXiv: 1805.04770v2, Jun. 29, 2018, pp. 1-10.

Wu et al., "The Optimization Method of Knowledge Distillation Based on Model Pruning," 2020 Chinese Automation Congress (CAC), IEEE, Nov. 6, 2020, pp. 1386-1390.

* cited by examiner

KNOWLEDGE DISTILLATION FOR SEMICONDUCTOR-BASED APPLICATIONS

BACKGROUND OF THE INVENTION

1. Field of the Invention

The present invention generally relates to methods and systems for determining information for a specimen. Certain embodiments relate to determining information for a specimen using a final knowledge distilled deep learning model trained by a knowledge distillation component with information generated by multiple deep learning models.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on specimens to drive higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Defect review typically involves re-detecting defects detected as such by an inspection process and generating additional information about the defects at a higher resolution using either a high magnification optical system or a scanning electron microscope (SEM). Defect review is therefore performed at discrete locations on specimens where defects have been detected by inspection. The higher resolution data for the defects generated by defect review is more suitable for determining attributes of the defects such as profile, roughness, more accurate size information, etc. Defects can generally be more accurately classified into defect types based on information determined by defect review compared to inspection.

Metrology processes are also used at various steps during a semiconductor manufacturing process to monitor and control the process. Metrology processes are different than inspection processes in that, unlike inspection processes in which defects are detected on a specimen, metrology processes are used to measure one or more characteristics of the specimen that cannot be determined using currently used inspection tools. For example, metrology processes are used to measure one or more characteristics of a specimen such as a dimension (e.g., line width, thickness, etc.) of features formed on the specimen during a process such that the performance of the process can be determined from the one or more characteristics. In addition, if the one or more characteristics of the specimen are unacceptable (e.g., out of a predetermined range for the characteristic(s)), the measurements of the one or more characteristics of the specimen may be used to alter one or more parameters of the process such that additional specimens manufactured by the process have acceptable characteristic(s).

Metrology processes are also different than defect review processes in that, unlike defect review processes in which defects that are detected by inspection are re-visited in defect review, metrology processes may be performed at locations at which no defect has been detected. In other words, unlike defect review, the locations at which a metrology process is performed on a specimen may be independent of the results of an inspection process performed on the specimen. In particular, the locations at which a metrology process is performed may be selected independently of inspection results. In addition, since locations on the specimen at which metrology is performed may be selected independently of inspection results, unlike defect review in which the locations on the specimen at which defect review is to be performed cannot be determined until the inspection results for the specimen are generated and available for use, the locations at which the metrology process is performed may be determined before an inspection process has been performed on the specimen.

Advances in deep learning have made deep learning an attractive framework for use in processes such as those described above. For example, some inspection processes using machine learning or deep learning empowered supervised detection via a convolutional neural network (CNN) or object detection networks. Despite the advantages such machine learning or deep learning approaches provide, they can also have a number of disadvantages. For example, some previously used models require multiple input modes to achieve relatively high performance. In another example, many currently used approaches require substantially large training datasets, which are not always practically obtainable or can incur substantially high cost of ownership in terms of time to results and physical expense (like wafers).

Accordingly, it would be advantageous to develop systems and methods for determining information for a specimen that do not have one or more of the disadvantages described above.

SUMMARY OF THE INVENTION

The following description of various embodiments is not to be construed in any way as limiting the subject matter of the appended claims.

One embodiment relates to a system configured to determine information for a specimen. The system includes a computer subsystem and one or more components executed by the computer subsystem that include multiple deep learning (DL) models configured for determining information for a specimen based on output generated by the specimen with one or more learning modes of an imaging subsystem. The one or more components also include a knowledge distillation (KD) component configured for combining output generated by the multiple DL models. In addition, the one or more components include a final knowledge distilled DL model configured for determining information for the specimen or an additional specimen based on output generated for the specimen or the additional specimen with one or more runtime modes of the imaging subsystem. Before the final knowledge distilled DL model determines the information, the KD component is configured for supervised training of the final knowledge distilled DL model using the combined output. The system may be further configured as described herein.

Another embodiment relates to a computer-implemented method for determining information for a specimen. The method includes determining information for a specimen by inputting output generated for the specimen with one or more learning modes of an imaging subsystem into multiple DL models and combining output generated by the multiple DL models. The method also includes performing supervised training of a final knowledge distilled DL model using the combined output and determining information for the specimen or an additional specimen by inputting output generated for the specimen or the additional specimen with one or more runtime modes of the imaging subsystem into the final knowledge distilled DL model. Determining information for the specimen, combining the output, performing supervised training, and determining information for the specimen or the additional specimen are performed by a computer subsystem. Each of the steps of the method described above may be performed as described further herein. The embodiment of the method described above may include any other step(s) of any other method(s) described herein. The method described above may be performed by any of the systems described herein.

Another embodiment relates to a non-transitory computer-readable medium storing program instructions executable on a computer system for performing a computer-implemented method for determining information for a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
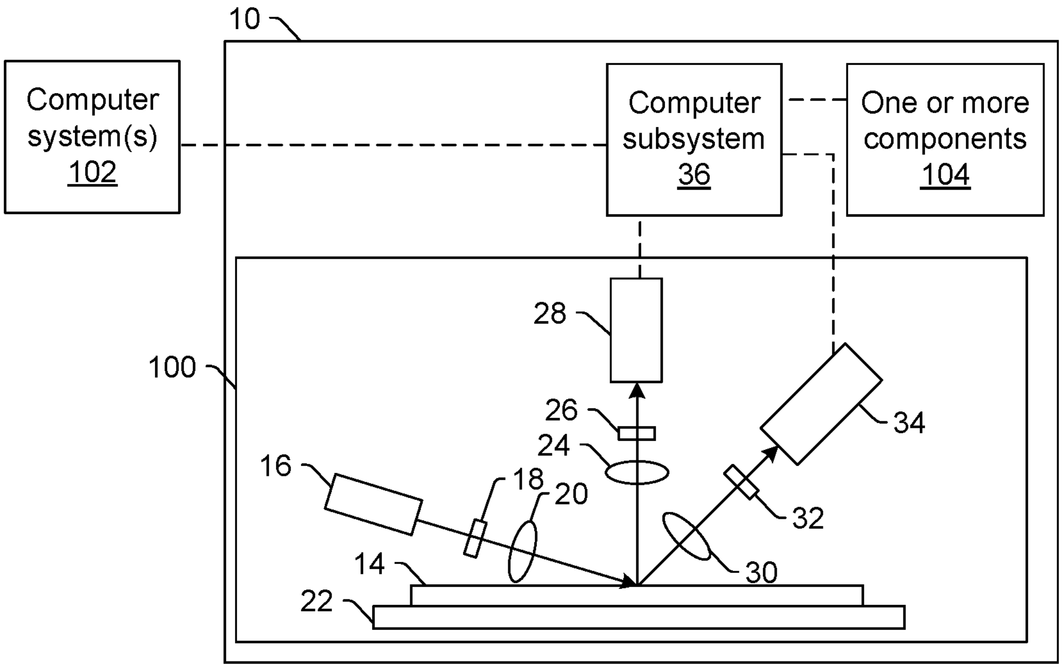
FIGS. 1 and 1*a* are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein are configured for determining information for a specimen for inspection applications, e.g., detecting defects on a specimen, and/or other semiconductor-based applications such as metrology and defect review.

In some embodiments, the specimen is a wafer. The wafer may include any wafer known in the semiconductor arts. Although some embodiments may be described herein with respect to a wafer or wafers, the embodiments are not limited in the specimens for which they can be used. For example, the embodiments described herein may be used for specimens such as reticles, flat panels, personal computer (PC) boards, and other semiconductor specimens.

One embodiment of a system configured for determining information for a specimen is shown in FIG. 1. In some embodiments, system 10 includes an imaging subsystem such as imaging subsystem 100. The imaging subsystem includes and/or is coupled to a computer subsystem, e.g., computer subsystem 36 and/or one or more computer systems 102.

In general, the imaging subsystems described herein include at least an energy source, a detector, and a scanning subsystem. The energy source is configured to generate energy that is directed to a specimen by the imaging subsystem. The detector is configured to detect energy from the specimen and to generate output responsive to the detected energy. The scanning subsystem is configured to change a position on the specimen to which the energy is directed and from which the energy is detected. In one embodiment, as shown in FIG. 1, the imaging subsystem is configured as a light-based imaging subsystem.

In the light-based imaging subsystems described herein, the energy directed to the specimen includes light, and the energy detected from the specimen includes light. For example, in the embodiment of the system shown in FIG. 1, the imaging subsystem includes an illumination subsystem configured to direct light to specimen 14. The illumination subsystem includes at least one light source. For example, as shown in FIG. 1, the illumination subsystem includes light source 16. The illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen and the process being performed on the specimen.

The illumination subsystem may be configured to direct the light to the specimen at different angles of incidence at different times. For example, the imaging subsystem may be configured to alter one or more characteristics of one or more elements of the illumination subsystem such that the light can be directed to the specimen at an angle of incidence that is different than that shown in FIG. 1. In one such example, the imaging subsystem may be configured to move light source 16, optical element 18, and lens 20 such that the light is directed to the specimen at a different oblique angle of incidence or a normal (or near normal) angle of incidence.

In some instances, the imaging subsystem may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, optical element 18 may be configured as a spectral filter and the properties of the spectral filter can be changed in a variety of different ways (e.g., by swapping out one spectral filter with another) such that different wavelengths of light can be directed to the specimen at different times. The illumination subsystem may have any other suitable configuration known in the art for directing light having different or the same characteristics to the specimen at different or the same angles of incidence sequentially or simultaneously.

Light source 16 may include a broadband plasma (BBP) light source. In this manner, the light generated by the light source and directed to the specimen may include broadband light. However, the light source may include any other suitable light source such as any suitable laser known in the art configured to generate light at any suitable wavelength(s). The laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for imaging.

The imaging subsystem may also include a scanning subsystem configured to change the position on the specimen to which the light is directed and from which the light is detected and possibly to cause the light to be scanned over the specimen. For example, the imaging subsystem may include stage 22 on which specimen 14 is disposed during imaging. The scanning subsystem may include any suitable mechanical and/or robotic assembly (that includes stage 22) that can be configured to move the specimen such that the light can be directed to and detected from different positions on the specimen. In addition, or alternatively, the imaging subsystem may be configured such that one or more optical elements of the imaging subsystem perform some scanning of the light over the specimen such that the light can be directed to and detected from different positions on the specimen. In instances in which the light is scanned over the specimen, the light may be scanned over the specimen in any suitable fashion such as in a serpentine-like path or in a spiral path.

The imaging subsystem further includes one or more detection channels. At least one of the detection channel(s) includes a detector configured to detect light from the specimen due to illumination of the specimen by the imaging subsystem and to generate output responsive to the detected light. For example, the imaging subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the imaging subsystem that includes two detection channels, the imaging subsystem may include a different number of detection channels (e.g., only one detection channel or two or more detection channels). In one such instance, the detection channel formed by collector 30, element 32, and detector 34 may form one side channel as described above, and the imaging subsystem may include an additional detection channel (not shown) formed as another side channel that is positioned on the opposite side of the plane of incidence. Therefore, the imaging subsystem may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the imaging subsystem may also include two or more side channels configured as described above. As such, the imaging subsystem may include at least three channels (i.e., one top channel and two side channels), and each of the at least three channels has its own collector, each of which is configured to collect light at different scattering angles than each of the other collectors.

As described further above, each of the detection channels included in the imaging subsystem may be configured to detect scattered light. Therefore, the imaging subsystem shown in FIG. 1 may be configured for dark field (DF) imaging of specimens. However, the imaging subsystem may also or alternatively include detection channel(s) that are configured for bright field (BF) imaging of specimens. In other words, the imaging subsystem may include at least one detection channel that is configured to detect light specularly reflected from the specimen. Therefore, the imaging subsystems described herein may be configured for only DF, only BF, or both DF and BF imaging. Although each of the collectors are shown in FIG. 1 as single refractive optical elements, each of the collectors may include one or more refractive optical elements and/or one or more reflective optical elements.

The one or more detection channels may include any suitable detectors known in the art such as photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the imaging subsystem may be signals or data, but not image signals or image data. In such instances, a computer subsystem such as computer subsystem 36 may be configured to generate images of the specimen from the non-imaging output of the detectors. However, in other instances, the detectors may be configured as imaging detectors that are configured to generate imaging signals or image data. Therefore, the imaging subsystem may be configured to generate images in a number of ways.

It is noted that FIG. 1 is provided herein to generally illustrate a configuration of an imaging subsystem that may be included in the system embodiments described herein. Obviously, the imaging subsystem configuration described herein may be altered to optimize the performance of the imaging subsystem as is normally performed when designing a commercial imaging system. In addition, the systems described herein may be implemented using an existing system (e.g., by adding functionality described herein to an existing inspection system) such as the 29xx/39xx series of tools that are commercially available from KLA Corp., Milpitas, Calif. For some such systems, the methods described herein may be provided as optional functionality of the system (e.g., in addition to other functionality of the system). Alternatively, the system described herein may be designed "from scratch" to provide a completely new system.

Computer subsystem 36 may be coupled to the detectors of the imaging subsystem in any suitable manner (e.g., via one or more transmission media, which may include "wired" and/or "wireless" transmission media) such that the computer subsystem can receive the output generated by the detectors. Computer subsystem 36 may be configured to perform a number of functions using the output of the detectors. For instance, if the system is configured as an inspection system, the computer subsystem may be configured to detect events (e.g., defects and potential defects) on the specimen using the output of the detectors. Detecting the events on the specimen may be performed as described further herein.

Computer subsystem 36 may be further configured as described herein. For example, computer subsystem 36 may be configured to perform the steps described herein. As such, the steps described herein may be performed "on-tool," by a computer subsystem that is coupled to or part of an imaging subsystem. In addition, or alternatively, computer system(s) 102 may perform one or more of the steps described herein. Therefore, one or more of the steps described herein may be performed "off-tool," by a computer system that is not directly coupled to an imaging subsystem.

Computer subsystem 36 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems. For example, computer subsystem 36 may be coupled to computer system(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Although the imaging subsystem is described above as being an optical or light-based imaging subsystem, in another embodiment, the imaging subsystem is configured as an electron beam imaging subsystem. In an electron beam imaging subsystem, the energy directed to the specimen includes electrons, and the energy detected from the specimen includes electrons. In one such embodiment shown in FIG. 1*a*, the imaging subsystem includes electron column 122, and the system includes computer subsystem 124 coupled to the imaging subsystem. Computer subsystem 124 may be configured as described above. In addition, such an imaging subsystem may be coupled to another one or more computer systems in the same manner described above and shown in FIG. 1.

Figure 1A:
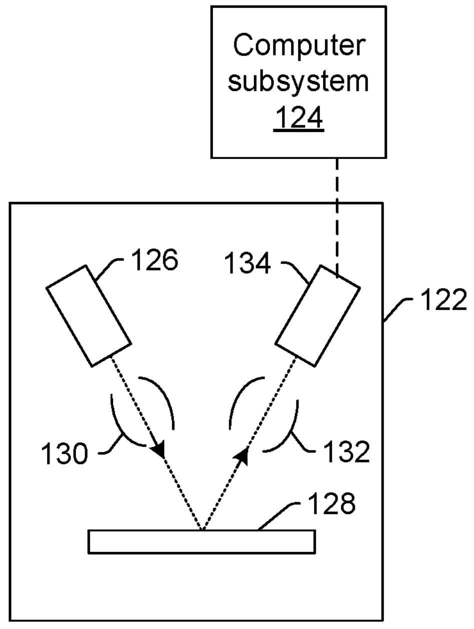

As also shown in FIG. 1*a*, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 1*a* as being configured such that the electrons are directed to the specimen at an oblique angle of incidence and are scattered from the specimen at another oblique angle, the electron beam may be directed to and scattered from the specimen at any suitable angles. In addition, the electron beam imaging subsystem may be configured to use multiple modes to generate output for the specimen as described further herein (e.g., with different illumination angles, collection angles, etc.). The multiple modes of the electron beam imaging subsystem may be different in any output generation parameters of the imaging subsystem.

Computer subsystem 124 may be coupled to detector 134 as described above. The detector may detect electrons returned from the surface of the specimen thereby forming electron beam images of (or other output for) the specimen. The electron beam images may include any suitable electron beam images. Computer subsystem 124 may be configured to detect events on the specimen using output generated by detector 134, which may be performed as described further herein. Computer subsystem 124 may be configured to perform any additional step(s) described herein. A system that includes the imaging subsystem shown in FIG. 1*a* may be further configured as described herein.

It is noted that FIG. 1*a* is provided herein to generally illustrate a configuration of an electron beam imaging subsystem that may be included in the embodiments described herein. As with the optical imaging subsystem described above, the electron beam imaging subsystem configuration described herein may be altered to optimize the performance of the imaging subsystem as is normally performed when designing a commercial system. In addition, the systems described herein may be implemented using an existing system (e.g., by adding functionality described herein to an existing system) such as tools that are commercially available from KLA. For some such systems, the methods described herein may be provided as optional functionality of the system (e.g., in addition to other functionality of the system). Alternatively, the system described herein may be designed "from scratch" to provide a completely new system.

Although the imaging subsystem is described above as being a light or electron beam imaging subsystem, the imaging subsystem may be an ion beam imaging subsystem. Such an imaging subsystem may be configured as shown in FIG. 1*a* except that the electron beam source may be replaced with any suitable ion beam source known in the art. In addition, the imaging subsystem may include any other suitable ion beam imaging system such as those included in commercially available focused ion beam (FIB) systems, helium ion microscopy (HIM) systems, and secondary ion mass spectroscopy (SIMS) systems.

As further noted above, the imaging subsystem may be configured to have multiple modes. In general, a "mode" is defined by the values of parameters of the imaging subsystem used to generate output for the specimen. Therefore, modes that are different may be different in the values for at least one of the imaging parameters of the imaging subsystem (other than position on the specimen at which the output is generated). For example, for a light-based imaging subsystem, different modes may use different wavelengths of light. The modes may be different in the wavelengths of light directed to the specimen as described further herein (e.g., by using different light sources, different spectral filters, etc. for different modes). In another embodiment, different modes may use different illumination channels. For example, as noted above, the imaging subsystem may include more than one illumination channel. As such, different illumination channels may be used for different modes.

The multiple modes may also be different in illumination and/or collection/detection. For example, as described further above, the imaging subsystem may include multiple detectors. Therefore, one of the detectors may be used for one mode and another of the detectors may be used for another mode. Furthermore, the modes may be different from each other in more than one way described herein (e.g., different modes may have one or more different illumination parameters and one or more different detection parameters). The imaging subsystem may be configured to scan the specimen with the different modes in the same scan or different scans, e.g., depending on the capability of using multiple modes to scan the specimen at the same time.

In some instances, the systems described herein may be configured as inspection systems. However, the systems described herein may be configured as another type of semiconductor-related quality control type system such as a defect review system and a metrology system. For example, the embodiments of the imaging subsystems described herein and shown in FIGS. 1 and 1*a* may be modified in one or more parameters to provide different imaging capability depending on the application for which they will be used. In one embodiment, the imaging subsystem is configured as an electron beam defect review subsystem. For example, the imaging subsystem shown in FIG. 1*a* may be configured to have a higher resolution if it is to be used for defect review or metrology rather than for inspection. In other words, the embodiments of the imaging subsystem shown in FIGS. 1 and 1*a* describe some general and various configurations for an imaging subsystem that can be tailored in a number of manners that will be obvious to one skilled in the art to produce imaging subsystems having different imaging capabilities that are more or less suitable for different applications.

As noted above, the imaging subsystem may be configured for directing energy (e.g., light, electrons) to and/or scanning energy over a physical version of the specimen thereby generating actual images for the physical version of the specimen. In this manner, the imaging subsystem may be configured as an "actual" imaging system, rather than a "virtual" system. However, a storage medium (not shown) and computer subsystem(s) 102 shown in FIG. 1 may be configured as a "virtual" system. In particular, the storage medium and the computer subsystem(s) are not part of imaging subsystem 100 and do not have any capability for handling the physical version of the specimen but may be configured as a virtual inspector that performs inspection-like functions, a virtual metrology system that performs metrology-like functions, a virtual defect review tool that performs defect review-like functions, etc. using stored detector output. Systems and methods configured as “virtual” systems are described in commonly assigned U.S. Pat. No. 8,126,255 issued on Feb. 28, 2012 to Bhaskar et al., U.S. Pat. No. 9,222,895 issued on Dec. 29, 2015 to Duffy et al., and U.S. Pat. No. 9,816,939 issued on Nov. 14, 2017 to Duffy et al., which are incorporated by reference as if fully set forth herein. The embodiments described herein may be further configured as described in these patents. For example, a computer subsystem described herein may be further configured as described in these patents.

The system includes a computer subsystem, which may include any configuration of any of the computer subsystem(s) or system(s) described above, and one or more components executed by the computer subsystem. For example, as shown in FIG. 1, the system may include computer subsystem 36 and one or more components 104 executed by the computer subsystem.

Figure 2:
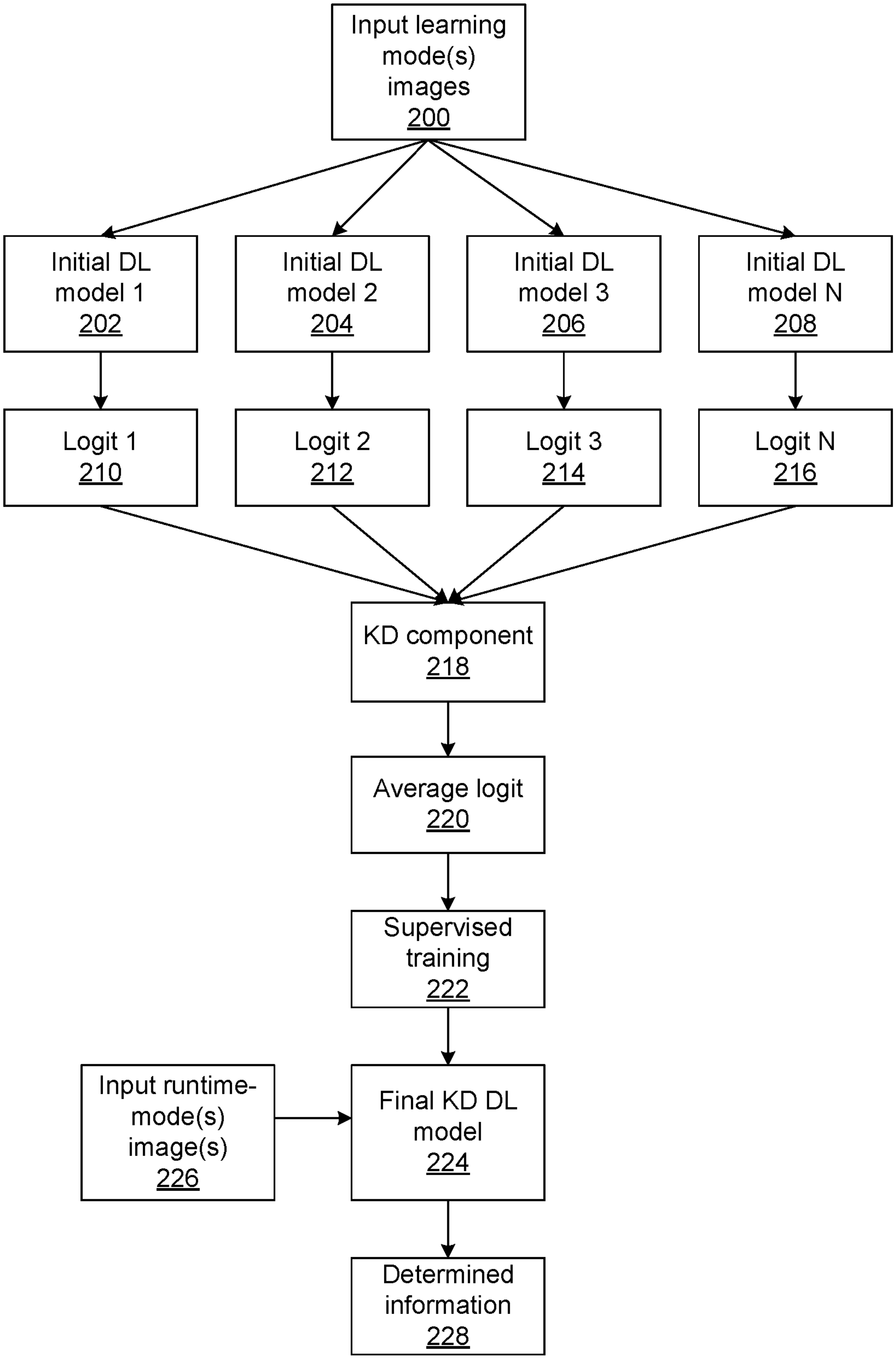
FIG. 2 is a flow chart illustrating an embodiment of steps that may be performed for determining information for a specimen.

The one or more components include multiple deep learning (DL) models (also referred to herein as “initial DL models”) configured for determining information for a specimen based on output generated for the specimen with one or more learning modes of an imaging subsystem. For example, the one or more components may include initial DL model 1 (202), initial DL model 2 (204), initial DL model 3 (206), . . . , and initial DL model N (208), as shown in FIG. 2. Although at least four initial DL models are shown in FIG. 2, the one or more components may include any suitable number of initial DL models, e.g., two or more initial DL models, more than four initial DL models, etc. The DL models do not model the physical imaging process of any of the modes. Instead, the DL models are trained to determine information from the input image(s) in a generative rather than a deterministic manner.

Each of the DL models (including the initial DL models and the final KD DL model described further below) may have or include any suitable DL architecture such as a convolutional neural network (CNN) architecture. The architecture of each of the DL models may be selected as described further herein. If one or more of the DL models is or includes a CNN, each of the CNN(s) may include any suitable types of layers such as convolution, pooling, fully connected, soft max, etc., layers having any suitable configuration known in the art. The architecture of any of the DL models may vary depending on the information for the specimen that is being determined since one DL architecture may be more suitable for an application like inspection rather than metrology while another DL architecture may be more suitable for metrology rather than inspection. The CNN may be trained as described herein or in any other suitable manner known in the art.

In one embodiment, the multiple DL models are configured as an ensemble of models. In some embodiments, each of the multiple DL models are configured for determining a same type of the information for the specimen. An “ensemble of models” is defined herein as a group of individual DL models trained either independently or jointly for solving a common task. In some applications in which the embodiments described herein may be used, the common task is predicting defect locations on a specimen. One significant advantage of the embodiments described herein is that while the individual DL models in the ensemble may be trained using multi-mode data or one or more learning modes, the final distilled model uses only the single best mode or modes to distill all of the information from the ensemble. In this manner, the embodiments can utilize the minimum amount of data while maintaining the maximum performance using a single DL model via a supervised manner.

The computer subsystem may acquire or generate input learning mode(s) images 200 as described further herein, which are input to the initial DL models by the computer subsystem. The input learning mode(s) images may be generated by the imaging subsystem and/or computer subsystem as described further herein.

The images that are input to each of the DL models may be the same. In other words, all of the learning mode(s) images may be input to each of the DL models. However, the manner in which each of the DL models uses the learning mode(s) images may be different. In other words, the multiple DL models do not necessarily have the same architecture configurations with the same parameters (but they may have the same architecture configurations with different parameters, different architectures, etc.). In this manner, the multiple DL models may not be simply multiple instances of the same DL model.

In other instances, the inputs to two or more of the DL models may be different. For example, as described further herein, different models may be configured to determine information for the specimen using different modes of the imaging subsystem. In this manner, the computer subsystem may input a first portion of the learning mode(s) images into initial DL model 1, a second portion of the learning mode(s) images into initial DL model 2, and so on, and the first and second portions may be different in one or more images and/or one or more learning modes. In this manner, not all of the multiple DL models may be configured to use images generated with more than one learning mode to determine information for the specimen. In other words, even if the multiple DL models have an overall multi-mode nature, not all of the multiple DL models necessarily use multiple learning modes of input images for determining specimen information.

In another embodiment, a first and a second of the multiple DL models are configured for determining information for the specimen based on the output generated for the specimen with only a first and a second of the one or more learning modes of the imaging subsystem, respectively. In this manner, one or more of the multiple DL models may be configured to use images generated with only a single learning mode of the imaging subsystem, and different DL models may be configured for different learning modes, i.e., a first DL model for a first learning mode, a second DL model for a second learning mode, and so on. Although different DL models may be configured for use with images generated with different, single learning modes, two or more of the DL models may be configured for use with images generated with the same single learning mode. In such instances, the two or more DL models may have different architectures or the same architecture with different parameters so that the DL models possibly generate different outputs from the same single learning mode images.

When at least one of the multiple DL models is configured for determining specimen information based on images generated with only a single learning mode, others of the multiple DL models may also be configured for determining specimen information based on images generated with only other single learning modes of the imaging subsystem. In other words, for each learning mode of the imaging subsystem, one of the multiple DL models may be configured for determining the specimen information based on only images generated with that learning mode. However, when at least one of the multiple DL models is configured for determining specimen information based on images generated with only a single learning mode of the imaging subsystem, one or more of the other multiple DL models may be configured for determining information based on images generated with multiple learning modes of the imaging subsystem. In this manner, the multiple DL models may include different combinations of models, one or more of which are configured to determine specimen information based on images generated with only a single learning mode of an imaging subsystem and possibly one or more others of which are configured to determine specimen information based on images generated with more than one learning mode of the imaging subsystem.

In a further embodiment, at least one of the multiple DL models is configured for determining information for the specimen based on the output generated for the specimen with at least two of the one or more learning modes of the imaging subsystem. This embodiment may be like the above described possibilities such as (1) all of the multiple DL models are configured for all of the learning modes, (2) not all of the multiple DL models are configured for all of the learning modes, in which case different DL models may be configured for different combinations of the learning modes, (3) one or more of the multiple DL models are configured for the same or different two or more learning modes while others of the multiple DL models are configured for only one of the learning modes, etc.

To summarize, therefore, while each of the multiple DL models may be configured for determining the same type of information for the specimen, which is application dependent, e.g., predicted defect locations for inspection applications, predicted structure characteristics for metrology applications, and so on, the multiple DL models may each be configured independently of each other. In this manner, each model in the ensemble may be different in terms of architecture, parameters, and the input data used. One or more of the multiple DL models may be configured for determining the information for the specimen based on images generated by each of the learning modes. One or more of the multiple DL models may be configured for determining the information for the specimen based on images generated by fewer than all of the learning modes. One or more of the multiple DL models may be configured for determining the information for the specimen based on images generated using only one learning mode. In that case, there may be at least a first DL model for a first learning mode and a second DL model for a learning second mode or at least a first DL model for a first learning mode and a second DL model for more than one learning mode. In this manner, not all of the multiple DL models may be configured for determining the information based on images generated using the same, single learning mode of the imaging subsystem (if a first DL model is configured for only a first learning mode, at least one other DL model may be configured for only a second learning mode different than the first or multiple learning modes). The models included in the multiple DL models and the learning mode(s) for which they are configured may be further selected as described herein.

In an additional embodiment, at least two of the multiple DL models are trained independently of each other before the multiple DL models determine the information for the specimen. In another embodiment, at least two of the multiple DL models are jointly trained before the multiple DL models determine the information for the specimen. In a further embodiment, the multiple DL models are trained in a supervised manner before the multiple DL models determine the information for the specimen. For example, each of the initial DL models shown in FIG. 2 may be trained independently or jointly in a supervised manner. Some of the initial DL models may be trained independently of each other, and others of the initial DL models may be trained jointly.

In general, supervised training of the DL models involves using labeled images of the specimen or another specimen of a same type as the specimen. In this manner, the training may be performed using the runtime specimen or a setup specimen. For example, the computer subsystem may obtain a dataset of labeled images and split them into train, test, and validation image sets. The computer subsystem may then perform supervised training, with validation, using CNNs or other suitable DL models with the images and their labels as inputs. The labels may vary depending on the information that is being determined for the specimen (e.g., a predicted defect location, a predicted metrology characteristic, a predicted defect review result, etc.). The supervised training may otherwise be performed in any suitable manner known in the art. The trained models may then be used to determine information from the specimen images generated for one or more setup specimens.

Any of the training described above may be performed by one or more computer subsystems included in the embodiments described herein. In this manner, the embodiments described herein may be configured for performing one or more setup or training functions for the multiple DL models. However, any of the training described above may be performed by another method or system (not shown), and that other method or system may make the trained DL models accessible to the embodiments described herein. In this manner, the embodiments described herein may be configured for training only the final KD DL model described further herein and for performing runtime functions like using the trained final KD DL model for determining information for one or more runtime specimens which may be the same or different than the setup specimens.

In one embodiment, the one or more learning modes of the imaging subsystem include the best known modes of the imaging subsystem. In another embodiment, the multiple DL models are configured to have the best known architectures for determining the information for the specimen. In a further embodiment, at least two of the multiple DL models are configured to have different architectures. For example, the embodiments described herein may be configured to train the individual DL models with the best architecture and the best single-mode or multi-mode data. The best architecture and single-mode or multi-mode data may be found by performing an exhaustive grid search or neural network architecture optimization. Such searching and/or optimization may result in selection of some combination of the multiple DL models described above. The top N architectures and single-mode or multi-mode data that provide the best performance may be chosen as individual models in an ensemble of models. After selecting the individual models, they can be trained independently or jointly. Training the N individual models jointly may require significant compute memory. As with the embodiments described above, even if two or more of the multiple DL models have different architectures and/or are for different learning mode(s), they may each be configured for determining the same type of information for the specimen.

Whether any one of the multiple DL models is configured for determining information for the specimen based on images generated for the specimen with only one learning mode or more than one learning mode, the input to the DL model may include not just images generated of the specimen by the imaging subsystem. For example, the input to any one of the DL models may include additional information such as one or more reference images corresponding to one or more specimen images, one or more difference images generated by subtracting a reference specimen image from a test specimen image, design information for the specimen, and the like. In this manner, for any one mode and any one DL model, there may be multiple channels of input into that DL model for that mode.

The one or more components also include a knowledge distillation (KD) component configured for combining output generated by the multiple DL models. For example, as shown in FIG. 2, the one or more components may include KD component 218. The KD component may have any architecture configuration and parameters suitable for performing the functions described further herein.

In some embodiments, the output generated by the multiple DL models and combined by the KD component includes logits generated by at least two of the multiple DL models. For example, the output of the multiple DL models may include individual logit files for each DL model. As shown in FIG. 2, for example, each of the initial DL models may generate a logit result. In particular, initial DL model 1 may generate logit 1 (210), initial DL model 2 may generate logit 2 (212), initial DL model 3 may generate logit 3 (214), and initial DL model N may generate logit N (216). Each of these logit results and/or files, possibly in combination with any other information generated or output by the initial DL models may be input to KD component 218.

While a "logit" may have different meanings in different contexts, as used herein, a "logit," also used interchangeably with the terms "logit result" and "logit file," is generally defined as a model output that is responsive to the probability that a result is correct. In this manner, a "logit" as that term is used herein may include any output of any layer of a DL model described herein that describes how confident that the model is about a result. A "logit," "logit file," or "logit result," can therefore be thought of as a kind of measure of how good a DL model result is. In some instances, in terms of DL, a layer of a DL model that feeds into a logit function is generally called a "logits layer," i.e., the layer that feeds into a softmax or other normalization layer. The output values of a logits layer are generally referred to as "logits," a "logits file," or a "logits result." The logits layer may produce values from −infinity to +infinity, i.e., a regression output, and the softmax or normalization layer may transform those values to values from 0 to 1, a predicted probability. The output of the softmax are the probabilities for whatever result that the DL model is generating, e.g., a classification. Therefore, although some embodiments are described herein with respect to "logits," the output that is combined by the KD component may include any output of the DL model that is responsive to how "good" the model output is.

In another embodiment, combining the output generated by the multiple DL models includes generating an average logit from logits generated by at least two of the multiple DL models. In a further embodiment, combining the output generated by the multiple DL models suppresses a portion of the information determined by the multiple DL models that is unimportant or incorrect. For example, the KD component may average the individual logit outputs into a single logit output. In one such example, KD component 218 may output average logit 220 generated from logit 1 (210), logit 2 (212), logit 3 (214), . . . logit N (216). Although combining all of the logits generated by all of the multiple DL models may be most commonly performed, that is not necessary and fewer than all of the logits generated by the multiple DL models may be combined. For example, if one of the logits clearly indicates that one of the multiple DL models performed in a way that is substantially different from each of the other models, that logit may be discarded and then the remaining logits can be combined. However, averaging all of the logits can essentially minimize any outlier DL model performance thereby rendering any pre-combination logit examination step unnecessary.

Averaging the logit outputs helps condense the most important information collectively from the individual DL models while suppressing the unimportant information. This operation can, therefore, help retain the most important signals of which a majority may correspond to defect locations (in the case of inspection) while suppressing false alarms. For example, as described further herein, the multiple DL models may be the best known models with the best known parameters for determining the information for the specimen. Therefore, generally, there may be a consensus among the multiple DL models in that at least a majority of them may determine the same information for the specimen, e.g., whether a defect is predicted at a specimen location or not. However, as with any process like those described herein, even when the process is optimized for the specimen and the imaging subsystem, there can be false positives, incorrect results, or other errors. For example, even the best inspection process will detect some nuisances. In this manner, even if the multiple DL models include the best known models, all of the models will not generate accurate specimen information predictions at all of the specimen locations. Therefore, by combining the logits as described above, the accurate predictions, which will generally be produced by a majority of the multiple DL models, will be enhanced while the inaccurate predictions, which will generally be produced by less than a majority of the models, will be suppressed.

In one particular but non-limiting example, if the predicted specimen information is predicted defect locations, a majority of the multiple DL models may accurately predict a defect location while one or more of the multiple DL models may not predict that defect location. Therefore, there will be a consensus among the multiple DL models that the specimen location is a defect location, which will be made clear by the combining step described above. The opposite may also be true. If only one of the multiple DL models predicts that a specimen location is a defect location, that predicted defect location will most likely be a nuisance or an erroneously predicted defect location and will be suppressed by the combining step described herein.

While averaging the outputs of the multiple DL models may be the easiest way to condense the most important information collectively from the individual DL models while suppressing unimportant information, any other function that performs in a similar manner may be used in place of averaging. For example, combining the outputs may include determining a median of the outputs, performing principal component analysis (PCA) of the outputs, performing linear discriminant analysis (LDA) of the outputs, and the like.

In this manner, the combined outputs of the multiple DL models may more accurately reflect the actual specimen information compared to the individual model outputs. Therefore, using the combined outputs for training of a final KD DL model as described herein can result in a better performing DL model even when that DL model determines specimen information based on images generated for the specimen with only a single mode or one or more runtime modes of the imaging subsystem.

The one or more components further include a final knowledge distilled DL model configured for determining information for the specimen or an additional specimen based on output generated for the specimen or the additional specimen with one or more runtime modes of the imaging subsystem. For example, the one or more components may include final KD DL model 224, as shown in FIG. 2 that uses input one or more runtime mode image(s) 226 to generate output that includes determined information 228. The final KD DL model may have any suitable configuration known in the art such as a CNN configuration. As with the initial DL models described above, the final KD DL model may have an architecture that is different than all of the initial DL models or an architecture that is the same as one or more of the initial DL models, possibly with one or more different parameters. The architecture of the final KD DL model may be determined empirically or in any other suitable manner.

The final KD DL model may determine information for the same specimen as the initial DL models or a different specimen. In this manner, the runtime specimen for which the final KD DL model determines information may or may not be the same as the setup specimen for which the initial DL models determine information. If the runtime and setup specimens are different, they may be of the same type. For example, the runtime and setup specimens may have the same designs and may have been processed in the same way prior to imaging. However, the runtime and setup specimens do not need to have the same designs and/or be processed in the same way prior to imaging if the specimens are similar enough that the same models can be used to determine information for the specimens. In addition, although the final KD DL model may be described herein as being configured for determining information for a specimen, after the final KD DL model is trained as described further herein, it can be used for determining information for as many runtime or setup specimens as desired.

The embodiments described herein, therefore, may utilize KD of one or more learning modes data to one or more runtime modes or even only a single mode. For example, preliminary results have shown the inventors that using multi-mode input data enables better performance compared to using single mode inputs. However, a disadvantage of using multi-mode data is that it adds considerable compute time during inference which includes data flow time and DL model compute time. Additionally, further experiments have shown us that using an ensemble of DL models configured to solve a common task provides enhanced performance compared to the individual DL models. Using an ensemble of DL models trained on multi-mode input data can, however, add up to significant compute time and memory requirements that are unreasonable. The embodiments described herein solve this problem by trying to incorporate all the information contained in the initial DL ensemble into a single final KD DL model. The embodiments will therefore have significant advantages because they will significantly improve current inference performance without adding any additional compute time. Moreover, there could be data limitations where certain input modes may not be available across the entire specimen due to problems during the data collection phase, which can cause issues when trying to train currently used DL models. The embodiments described herein can solve this problem because they need only knowledge learned by the prior individual DL models and not the input data itself.

Before the final KD DL model determines the information, the KD component is configured for supervised training of the final KD DL model using the combined output. For example, as shown in FIG. 2, KD component 218 may perform supervised training 222 of final KD DL model 224 using the combined output of the initial DL models shown in this embodiment as average logit 220. In this manner, the embodiments described herein may use KD to leverage information from multiple DL models (e.g., an ensemble of CNNs) trained using learning-mode data to train a final KD DL model (e.g., a single CNN) that uses one or more runtime mode data or single mode data. Supervised training of the final KD DL model may include using the imaging subsystem output generated with the top most one or more runtime modes and the combined output of the multiple DL models (e.g., the average logit output) as input to the final KD DL model and training the final KD DL model using KD via supervised training.

KD can be generally defined as the process of using past information from other DL models (or called teacher models) to improve the performance of a single model (or called student model). In the embodiments described herein, the information learned from various DL models using learning mode(s) is distilled as input into a final KD DL model using one or more runtime modes of input or even a single mode of input. Such training helps in significantly improving the performance and reducing the compute time during inference. For example, the embodiments described herein may be able to use a substantially small amount of training data compared to training other supervised models. Since the embodiments described herein can perform training using only a minimal amount of data compared to that required for training comparable supervised models, the embodiments described herein can reduce the computation time during inference.

Supervised KD training is a branch of machine learning (ML) that uses annotated data (e.g., in the case of inspection, defect locations are the annotated ground truth) as well information learned from past DL models to train a new improved DL model. In the embodiments described herein, combinations of different DL/ML models are used to learn distinct features that can be used as prior information for training our final KD DL model. Doing so helps the final KD DL model learn more information about the specimen such as defective patterns, further improving our performance during inference.

In one embodiment, the one or more runtime modes of the imaging subsystem are selected from the one or more learning modes based on the information determined for the specimen by the multiple DL models. In this manner, the embodiments described herein may be configured for optical (or other) mode optimization for defect detection (or metrology, defect review, etc.) via KD. For example, the final KD DL model may be configured for using the imaging subsystem output generated with the top most single mode or modes for determining information for the specimen. That top most single mode or modes of the imaging subsystem may be known a priori based on information about past imaging subsystem performance. The top most single mode or modes may however also be determined based on the output generated by the multiple DL models. For example, by comparing the specimen information determined by two or more of the multiple DL models, the multiple DL model or models that produced the best specimen information can be determined. A learning mode or modes used with that multiple DL model may then be identified as the best based on the information generated by that multiple DL model. In another example, the best performing of the multiple DL models may be identified by comparing the specimen information determined by two or more of the multiple DL models and any learning mode(s) that are common to those DL models may be examined for selection as the single mode or modes used at runtime. The top mode(s) may also be found using a greedy search algorithm or another suitable method or algorithm based on information generated by the multiple DL models and/or any other available information about the learning modes of the imaging subsystem and how they perform for determining the information for the specimen.

In this manner, the set of single/multiple modes included in the one or more runtime modes can be a subset of learning mode(s) used to generate input for the multiple DL models or one or more different modes not in the original inputs and/or specified by application or a user. In addition, input one or more runtime mode image(s) 226 can be a subset of the initial learning modes, a set of modes that are different than the initial ones, and/or a combination of old and new modes.

In another embodiment, during a process performed on the specimen or the additional specimen for determining the information with the final KD DL model, the imaging subsystem generates the output for the specimen with only the one or more runtime modes of the imaging subsystem and the computer subsystem inputs the output generated with only the one or more runtime modes into only the final KD DL model. In this manner, during runtime, the imaging subsystem may generate output, e.g., images, for the specimen using only a single mode or modes of the imaging subsystem, e.g., by scanning the specimen with only one mode or only multiple runtime modes. Therefore, unlike some previously used DL models that require multiple input modes to achieve relatively high performance, the embodiments described herein can leverage all multi-mode information during setup and distill it into a single mode (or limited number of modes) final KD DL model for use in runtime. In other words, once the learning mode or modes data has been input to the multiple DL models to thereby generate output used to train the final KD DL model, the learning mode or modes may no longer be needed for the process (e.g., inspection, metrology, defect review). Therefore, the multiple DL models described herein are not used during runtime. During runtime then, the specimen is scanned with only the one or more runtime modes and that output is the only input to the final KD model.

In this manner, the embodiments described herein provide the ability to replace an ensemble of many individual DL models with a single DL model by distilling features from learning mode or modes data to a single mode or one or more runtime modes. The embodiments described herein can also, therefore, provide a systematic approach to reducing the number of modes (for inspection or another application described herein) required in applications such as defect/reticle inspection while providing similar or better detection sensitivity than multi-mode processes, which can be applied to optical inspection (and other) tools described herein for improving tool throughput and reducing cost of ownership of the tools, especially for multi-mode inspection and other processes. One advantage of the embodiments described herein is therefore that they can significantly improve the performance during inference while reducing the compute time. In addition, the embodiments described herein use a single knowledge distilled DL model during runtime instead of an ensemble of individual DL models, which saves significant inference compute time while maintaining substantially high performance.

In some embodiments, the information determined for the specimen or the additional specimen by the final KD DL model includes predicted defect locations on the specimen. In this manner, the embodiments described herein may use a DL based CNN or another DL model to predict the location of a defect on a BBP or other image by leveraging information learned using an ensemble of well-trained individual CNN or other DL models. In other words, the embodiments described herein distill important features from one or more learning modes to one or more runtime modes or a single mode for determining specimen information such as predicting defect locations. One advantage of the embodiments described herein is that they can predict defect locations that have signal-to-noise ratios (SNRs) greater than that of noise suppression algorithms and other supervised CNN models. For example, using an ensemble of models as described herein to generate training data for the final KD DL model can reduce the variance of prediction and improve the accuracy (thereby providing better SNR of predicted defect locations in the case of inspection applications by suppressing the noise signal much better compared to other approaches while maintaining the defect signal).

The predicted defect locations determined by the final KD DL model may be determined in an inspection process in which a relatively large area on the specimen is scanned by the imaging subsystem and then images generated by such scanning are inspected for potential defects. In addition to predicted defect locations, the final KD DL model may be configured for determining other information for the predicted defect locations such as defect classifications and possibly defect attributes. In general, via the supervised training described herein and with an appropriate architecture, the final KD DL model may be configured for generating one or more inspection-like results for the specimen. Essentially, therefore, the final KD DL model may have multiple output channels, each for a different type of information. The outputs from multiple channels may then be combined into a single inspection results file (e.g., a KLARF file generated by some KLA inspection tools) for the specimen. In this manner, for any one location on the specimen, there may be multiple types of information in the inspection results file.

In a similar manner, the process may be a defect review process. Unlike inspection processes, a defect review process generally revisits discrete locations on a specimen at which a defect has been detected. An imaging subsystem configured for defect review may generate specimen images as described herein, which may be input to the final KD DL model. The final KD DL model may be trained and configured for determining if a defect is actually present at a defect location identified by inspection and for determining one or more attributes of the defect like a defect shape, dimensions, roughness, background pattern information, etc. and/or for determining a defect classification (e.g., a bridging type defect, a missing feature defect, etc.). The final KD DL model may otherwise be trained and configured as described above.

As described above, in some embodiments, the imaging subsystem may be configured for metrology of the specimen. In one such embodiment, determining the information includes determining one or more characteristics of a specimen structure in an input image. For example, the DL models described herein may be trained with images labeled with metrology information. The metrology information may include any metrology information of interest, which may vary depending on the structures on the specimen. Examples of such metrology information include, but are not limited to, critical dimensions (CDs) such as line width and other dimensions of the specimen structures. Once the final KD DL model has been trained as described herein, that final KD DL model can be used to predict metrology information from unlabeled (test) specimen images. The unlabeled specimen images may include any images generated by any metrology tool, which may have a configuration such as that described herein or any other suitable configuration known in the art. In this manner, the embodiments described herein may advantageously use a specimen image generated by a metrology tool for predicting metrology information for the specimen and any one or more specimen structures included in the input image.

The computer subsystem may also be configured for generating results that include the determined information, which may include any of the results or information described herein. The results of determining the information may be generated by the computer subsystem in any suitable manner. All of the embodiments described herein may be configured for storing results of one or more steps of the embodiments in a computer-readable storage medium. The results may include any of the results described herein and may be stored in any manner known in the art. The results that include the determined information may have any suitable form or format such as a standard file type. The storage medium may include any storage medium described herein or any other suitable storage medium known in the art.

After the results have been stored, the results can be accessed in the storage medium and used by any of the method or system embodiments described herein, formatted for display to a user, used by another software module, method, or system, etc. to perform one or more functions for the specimen or another specimen of the same type. For example, results produced by the computer subsystem described herein may include information for any defects detected on the specimen such as location, etc., of the bounding boxes of the detected defects, detection scores, information about defect classifications such as class labels or IDs, any defect attributes determined from any of the images, etc., predicted specimen structure measurements, dimensions, shapes, etc. or any such suitable information known in the art. That information may be used by the computer subsystem or another system or method for performing additional functions for the specimen and/or the detected defects such as sampling the defects for defect review or other analysis, determining a root cause of the defects, etc.

Such functions also include, but are not limited to, altering a process such as a fabrication process or step that was or will be performed on the specimen in a feedback or feedforward manner, etc. For example, the computer subsystem may be configured to determine one or more changes to a process that was performed on the specimen and/or a process that will be performed on the specimen based on the determined information. The changes to the process may include any suitable changes to one or more parameters of the process. In one such example, the computer subsystem preferably determines those changes such that the defects can be reduced or prevented on other specimens on which the revised process is performed, the defects can be corrected or eliminated on the specimen in another process performed on the specimen, the defects can be compensated for in another process performed on the specimen, etc. The computer subsystem may determine such changes in any suitable manner known in the art.

Those changes can then be sent to a semiconductor fabrication system (not shown) or a storage medium (not shown) accessible to both the computer subsystem and to the semiconductor fabrication system. The semiconductor fabrication system may or may not be part of the system embodiments described herein. For example, the imaging subsystem and/or the computer subsystem described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

The embodiments described herein have a number of advantages in addition to those already described. For example, the embodiments described herein provide a way to distill single or multiple learning mode data into one or more runtime modes or even a single mode while maintaining or improving the sensitivity. In other words, when training the individual models in the ensemble, any combinations of learning-mode data can be used as input whereas the final KD model just requires one mode (e.g., the top most single mode) even though more than one mode may be used at runtime. Therefore, the approaches described herein can distill multi-mode training data to just one single mode. In addition, the embodiments described herein can leverage information learned by other supervised models to further improve the sensitivity. In other words, the embodiments described herein provide a way to use an ensemble of models to improve the performance of a different DL model. The embodiments described herein can also improve the performance during runtime inference. Furthermore, the embodiments described herein can reduce the compute time during runtime inference without significantly compromising on performance throughput. The embodiments described herein can also provide significantly higher SNR for the determined information such as predicted defect locations. In another example, the embodiments may have more stable sensitivity with respect to process variations, e.g., variations on the specimen due to variations in a process performed on the specimen, variations in the specimen images input to the final KD DL model due to variations in the process performed on the specimen and/or the variations in the imaging process, etc.

Each of the embodiments described above may be combined together into one single embodiment. In other words, unless otherwise noted herein, none of the embodiments are mutually exclusive of any other embodiments.

Another embodiment relates to a computer-implemented method for determining information for a specimen. The method includes determining information for a specimen by inputting output generated for the specimen with one or more learning modes of an imaging subsystem into multiple DL models and combining output generated by the multiple DL models. The method also includes performing supervised training of a final KD DL model using the combined output and determining information for the specimen or an additional specimen by inputting output generated for the specimen or the additional specimen with one or more runtime modes of the imaging subsystem into the final KD DL model. Determining information for the specimen, combining the output, performing supervised training, and determining information for the specimen or the additional specimen are performed by a computer subsystem, which may be configured according to any of the embodiments described herein.

Each of the steps of the method may be performed as described further herein. The method may also include any other step(s) that can be performed by the imaging subsystem and/or computer subsystem described herein. In addition, the method described above may be performed by any of the system embodiments described herein.

Figure 3:
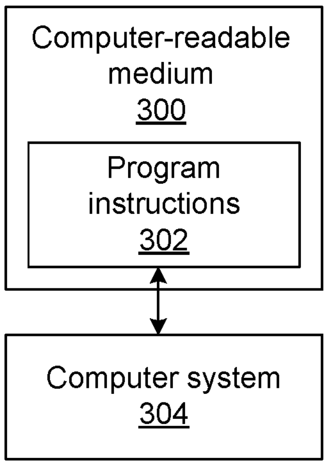
FIG. 3 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for determining information for a specimen. One such embodiment is shown in FIG. 3. In particular, as shown in FIG. 3, non-transitory computer-readable medium 300 includes program instructions 302 executable on computer system 304. The computer-implemented method may include any step(s) of any method(s) described herein.

Program instructions 302 implementing methods such as those described herein may be stored on computer-readable medium 300. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension), Python, Tensorflow, or other technologies or methodologies, as desired.

Computer system 304 may be configured according to any of the embodiments described herein.

Further modifications and alternative embodiments of various aspects of the invention will be apparent to those skilled in the art in view of this description. For example, methods and systems for determining information for a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain attributes of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured for determining information for a specimen, comprising:

an imaging subsystem comprising at least an energy source and a detector, wherein the energy source is configured to generate energy directed to a specimen by the imaging subsystem, and wherein the detector is configured to detect energy from the specimen and to generate output responsive to the detected energy;

a computer subsystem; and one or more components executed by the computer subsystem, wherein the one or more components comprise: multiple deep learning models configured for determining information for the specimen based on the output generated for the specimen with two or more learning modes of the imaging subsystem, wherein two or more of the multiple deep learning models are further configured for determining the information based on the output generated for the specimen with different combinations of the two or more learning modes of the imaging subsystem, respectively;

a knowledge distillation component configured for combining output generated by the multiple deep learning models and performing supervised training of a final knowledge distilled deep learning model with the combined output, wherein combining the output generated by the multiple deep learning models suppresses results produced by fewer than a majority of the multiple deep learning models in the combined output thereby suppressing inaccurate results produced by the multiple deep learning models in the combined output; and the final knowledge distilled deep learning model, wherein subsequent to the supervised training, is configured for determining information for the specimen or an additional specimen based on output generated for the specimen or the additional specimen with one or more runtime modes of the imaging subsystem, and wherein the one or more runtime modes comprise fewer modes than the two or more learning modes; and wherein the computer subsystem is configured for altering a fabrication process performed on the specimen or the additional specimen based on the information determined for the specimen or the additional specimen.

2. The system of claim 1, wherein the multiple deep learning models are further configured as an ensemble of models.

3. The system of claim 1, wherein each of the multiple deep learning models are further configured for determining a same type of the information for the specimen.

4. The system of claim 1, wherein a first and a second of the multiple deep learning models are further configured for determining information for the specimen based on the output generated for the specimen with only a first and a second of the two or more learning modes of the imaging subsystem, respectively.

5. The system of claim 1, wherein at least one of the multiple deep learning models is further configured for determining information for the specimen based on the output generated for the specimen with at least two of the two or more learning modes of the imaging subsystem.

6. The system of claim 1, wherein at least two of the multiple deep learning models are trained independently of each other before the multiple deep learning models determine the information for the specimen.

7. The system of claim 1, wherein at least two of the multiple deep learning models are jointly trained before the multiple deep learning models determine the information for the specimen.

8. The system of claim 1, wherein the multiple deep learning models are trained in a supervised manner before the multiple deep learning models determine the information for the specimen.

9. The system of claim 1, wherein the two or more learning modes of the imaging subsystem comprise best known modes of the imaging subsystem.

10. The system of claim 1, wherein the multiple deep learning models are further configured to have best known architectures for determining the information for the specimen.

11. The system of claim 1, wherein at least two of the multiple deep learning models are further configured to have different architectures.

12. The system of claim 1, wherein the output generated by the multiple deep learning models and combined by the knowledge distillation component comprises logits generated by at least two of the multiple deep learning models.

13. The system of claim 1, wherein combining the output generated by the multiple deep learning models comprises generating an average logit from logits generated by at least two of the multiple deep learning models.

14. The system of claim 1, wherein the one or more runtime modes of the imaging subsystem are selected from the two or more learning modes based on the information determined for the specimen by the multiple deep learning models.

15. The system of claim 1, wherein during a process performed on the specimen or the additional specimen for determining the information with the final knowledge distilled deep learning model, the imaging subsystem generates the output for the specimen with only the one or more runtime modes of the imaging subsystem and the computer subsystem inputs the output generated with only the one or more runtime modes into only the final knowledge distilled deep learning model.

16. The system of claim 1, wherein the information determined for the specimen or the additional specimen by the final knowledge distilled deep learning model comprises predicted defect locations on the specimen.

17. The system of claim 1, wherein the imaging subsystem is configured as a light-based imaging subsystem.

18. The system of claim 1, wherein the supervised training comprises training the final knowledge distilled deep learning model with annotated data in combination with the combined output.

19. The system of claim 1, wherein the information determined by the multiple deep learning models comprises distinct features of the specimen learned by the multiple deep learning models, and wherein the supervised training teaches the final knowledge distilled deep learning model information about the specimen.

20. The system of claim 1, wherein the information determined for the specimen or the additional specimen by the final knowledge distilled deep learning model comprises predicted defect locations on the specimen, and wherein the supervised training using the combined output suppresses noise signals while maintaining defect signals.

21. The system of claim 1, wherein the information determined for the specimen or the additional specimen by the final knowledge distilled deep learning model comprises predicted defect locations on the specimen and defect classifications.

22. The system of claim 1, wherein the information determined for the specimen or the additional specimen by the final knowledge distilled deep learning model comprises predicted defect locations on the specimen and defect attributes.

23. The system of claim 1, wherein the final knowledge distilled deep learning model is further configured for determining the information by determining if a defect is present at a defect location identified by inspection and for determining one or more attributes of the defect.

24. The system of claim 1, wherein the final knowledge distilled deep learning model is further configured for determining the information by determining if a defect is present at a defect location identified by inspection and for determining a defect classification of the defect.

25. The system of claim 1, wherein the final knowledge distilled deep learning model is further configured for determining the information by determining one or more characteristics of a specimen structure in an input image in the output generated for the specimen or the additional specimen with the one or more runtime modes of the imaging subsystem.

26. The system of claim 1, wherein the computer subsystem is further configured for determining one or more changes to the fabrication process that was performed on the specimen or the additional specimen based on the information determined by the final knowledge distilled deep learning model.

27. The system of claim 1, wherein the computer subsystem is further configured for determining one or more changes to the fabrication process that will be performed on the specimen or the additional specimen based on the information determined by the final knowledge distilled deep learning model.

28. The system of claim 1, wherein the two or more learning modes are different than the one or more runtime modes.

29. A non-transitory computer-readable medium, storing program instructions executable on a computer system for performing a computer-implemented method for determining information for a specimen, wherein the computer-implemented method comprises:

directing energy generated by an energy source to a specimen with an imaging subsystem in which the energy source is included;

detecting energy from the specimen and generating output responsive to the detected energy with a detector included in the imaging subsystem;

determining information for the specimen by inputting the output generated for the specimen with two or more learning modes of the imaging subsystem into multiple deep learning models, wherein two or more of the multiple deep learning models are configured for determining the information based on the output generated for the specimen with different combinations of the two or more learning modes of the imaging subsystem, respectively;

combining output generated by the multiple deep learning models, wherein combining the output generated by the multiple deep learning models suppresses results produced by fewer than a majority of the multiple deep learning models in the combined output thereby suppressing inaccurate results produced by the multiple deep learning models in the combined output;

performing supervised training of a final knowledge distilled deep learning model using the combined output;

determining information for the specimen or an additional specimen by inputting output generated for the specimen or the additional specimen with one or more runtime modes of the imaging subsystem into the final knowledge distilled deep learning model, wherein the one or more runtime modes comprise fewer modes than the two or more learning modes; and altering a fabrication process performed on the specimen or the additional specimen based on the information determined for the specimen or the additional specimen.

30. A computer-implemented method for determining information for a specimen, comprising:

directing energy generated by an energy source to a specimen with an imaging subsystem in which the energy source is included;

detecting energy from the specimen and generating output responsive to the detected energy with a detector included in the imaging subsystem;

determining information for the specimen by inputting the output generated for the specimen with two or more learning modes of the imaging subsystem into multiple deep learning models, wherein two or more of the multiple deep learning models are configured for determining the information based on the output generated for the specimen with different combinations of the two or more learning modes of the imaging subsystem, respectively;

combining output generated by the multiple deep learning models, wherein combining the output generated by the multiple deep learning models suppresses results produced by fewer than a majority of the multiple deep learning models in the combined output thereby suppressing inaccurate results produced by the multiple deep learning models in the combined output;

performing supervised training of a final knowledge distilled deep learning model using the combined output;

determining information for the specimen or an additional specimen by inputting output generated for the specimen or the additional specimen with one or more runtime modes of the imaging subsystem into the final knowledge distilled deep learning model, wherein the one or more runtime modes comprise fewer modes than the two or more learning modes; and altering a fabrication process performed on the specimen or the additional specimen based on the information determined for the specimen or the additional specimen, wherein determining information for the specimen, combining the output, performing supervised training, determining information for the specimen or the additional specimen, and altering a fabrication process are performed by a computer subsystem.

* * * * *